United States Patent
Gold et al.

(10) Patent No.: US 6,934,881 B2
(45) Date of Patent: Aug. 23, 2005

(54) MEMORY INCLUDING PORTION STORING A COPY OF PRIMARY OPERATING SYSTEM AND METHOD OF OPERATING COMPUTER INCLUDING THE MEMORY

(75) Inventors: Stephen Gold, Bristol (GB); Peter Thomas Camble, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 490 days.

(21) Appl. No.: 09/843,148

(22) Filed: Apr. 27, 2001

(65) Prior Publication Data

US 2002/0053044 A1 May 2, 2002

(30) Foreign Application Priority Data

Oct. 6, 2000 (GB) .............................................. 0024580

(51) Int. Cl.[7] .................................................. G06F 11/00
(52) U.S. Cl. ............................................. 714/15; 714/6
(58) Field of Search ................................. 714/6, 15, 20, 714/54

(56) References Cited

U.S. PATENT DOCUMENTS

| | | | | |
|---|---|---|---|---|
| 5,269,022 A | | 12/1993 | Shinjo et al. ................ 395/700 |
| 5,469,573 A | | 11/1995 | McGill, III et al. | |
| 5,708,776 A | | 1/1998 | Kikinis | |
| 5,713,024 A | * | 1/1998 | Halladay ..................... 717/168 |
| 5,715,462 A | | 2/1998 | Iwamoto et al. ............. 395/712 |
| 5,745,669 A | * | 4/1998 | Hugard et al. ................. 714/3 |
| 5,829,045 A | * | 10/1998 | Motoyama ................... 711/162 |
| 5,960,445 A | | 9/1999 | Tamori et al. ............... 707/203 |
| 6,016,553 A | * | 1/2000 | Schneider et al. ............. 714/21 |
| 6,145,088 A | * | 11/2000 | Stevens .......................... 714/2 |
| 6,170,055 B1 | | 1/2001 | Meyer et al. .................. 713/2 |
| 6,173,417 B1 | | 1/2001 | Merrill ........................ 714/15 |
| 6,195,695 B1 | * | 2/2001 | Cheston et al. .............. 709/221 |
| 6,281,894 B1 | * | 8/2001 | Rive ............................ 345/705 |
| 6,314,532 B1 | * | 11/2001 | Daudelin et al. .............. 714/38 |
| 6,385,707 B1 | * | 5/2002 | Maffezzoni ................. 711/162 |
| 6,393,585 B1 | | 5/2002 | Houha et al. .................. 714/23 |
| 6,427,091 B1 | | 7/2002 | Davis et al. ................. 700/115 |
| 6,519,762 B1 | * | 2/2003 | Colligan et al. ............. 717/170 |
| 6,543,004 B1 | * | 4/2003 | Cagle et al. .................. 714/15 |
| 6,557,169 B1 | | 4/2003 | Erpeldinger ................ 717/173 |
| 6,591,376 B1 | * | 7/2003 | VanRooven et al. .......... 714/36 |
| 6,625,754 B1 | * | 9/2003 | Aguilar et al. ................ 714/15 |

FOREIGN PATENT DOCUMENTS

| | | |
|---|---|---|
| EP | 0 898 225 A1 | 2/1999 |
| EP | 0 917 060 A1 | 5/1999 |
| EP | 0 978 785 | 2/2000 |
| GB | 2 336 921 A | 11/1999 |
| GB | 2 346 719 A | 8/2000 |
| JP | 2000-035920 | 2/2000 |
| WO | WO 95/22794 * | 8/1995 ........... G06F/11/14 |

OTHER PUBLICATIONS http://www.lanworks.com/bootservices/d_recovery.pdf, 3Com Dynamic Access Boot Services and Disaster Recovery Technical Paper, Jun. 21, 2000, (see pp. 1, 3, and 5).
http://www.pc.ibm.com/us/infobrf/configsf1.html, Config-Safe Information Brief, 1998.

* cited by examiner

*Primary Examiner*—Robert Beausoliel
*Assistant Examiner*—Gabriel L. Chu

(57) ABSTRACT

A method of installing an operating system into a computer entity comprising at least one data storage device, a primary operating system and an emergency operating system, the method characterized by comprising the steps of: creating a copy of the primary operating system on an operating system back-up area of the data storage device of the computer entity; operating the computer entity using the emergency operating system; storing data of the computer entity on a user settings archive of the data storage device; replacing the primary operating system with the copy of the primary operating system; automatically checking for corrupted data on the user settings archive; restoring settings data of the computer entity from the user settings archive. In the event of a failure involving data corruption, application data may be deleted and recreated in a known good default state.

24 Claims, 12 Drawing Sheets

MEMORY INCLUDING PORTION STORING A COPY OF PRIMARY OPERATING SYSTEM AND METHOD OF OPERATING COMPUTER INCLUDING THE MEMORY

FIELD OF THE INVENTION

The present invention relates computers and particularly to a method of installing an operating system in a computer entity, in the event of a system failure.

BACKGROUND TO THE INVENTION

Headless computer entities are known in the art, and are also known as "headless appliances". A known headless computer entity comprises a data-processor, memory, a plurality on input\output ports or the like, and an operating system. However, headless appliances are generally designed without user interfaces, and lack a keyboard, pointing device e.g. mouse or track ball, and visual display monitor. This has the advantages both of reducing the cost of ownership, since the cost of the user interface hardware need not be borne by the purchaser, and also inhibits interference with the operation of the appliance.

If an operating system failure occurs in some way, either due to data corruption a software bug or the like, then a headless appliance will simply stop functioning, and cannot be repaired manually except by replacing a data storage device, e.g. a system disk, with a new manufactured system disk containing a default operating system and default operating system configuration settings for the whole appliance. Replacement of the disk may involve erasing all data on the appliance. In a headless appliance there is no way that a human administrator of the appliance can directly manually install software updates to an internal operating system, or to application software since there is no system console.

A prior art solution used in headless appliances is to place an operating system in a flash ROM, thereby ensuring that the operating system cannot be easily damaged. This is fine for appliances in which an operating system can be contained in a flash ROM, such as a network attached storage device (NAS). However, where a headless computer entity is running applications, the operating system is far to large to fit into a flash ROM and has to be stored on a hard disk. Hard disks are vulnerable to corruption and damage and there is a risk of operating system failure where the operating system is stored on a hard disk.

A prior art solution for rectifying failure of an operating system stored on a hard disk includes a system developed by Microsoft® and Intel®, in which hardware and BIOS additions to a processor and hard disk ensure that if a running primary operating system fails in any way, for example fails to boot, locks up or crashes, then the BIOS switches to another identical copy of the operating system stored on a hard disk. This system is based on:

An NVRAM message passing interface between a BIOS and the primary operating system, allowing the primary operating system to indicate to the BIOS that it has booted successfully.

Hardware "watchdog" timers which reset the hardware if the primary operating system fails to clear the timers, so that if the operating system locks, the watchdog timers are not cleared, and the system automatically detects this and resets the BIOS extensions which trigger a boot from a second partition on the hard disk containing a secondary operating system if the primary operating system stored on the first partition fails to boot twice.

Software to check that the primary operating system fully boots, by monitoring key services provided by the operating system, and making sure that they are running smoothly after boot of the operating system.

The concept of an operating system rebuild function in which a secondary operating system rebuilds a primary operating system from a compressed pristine version of the primary operating system is known in the Microsoft\Intel system. However, this known system assumes that the primary operating system is static and invariant with time.

In the case of computer entities running applications, there are many configuration settings which need to be made and reapplied. Therefore, in a computer entity running applications, there are other parts of software and code beyond the operating system which may need to be included in a full system rebuild following a failure of an operating system. The known rebuild system of Microsoft\Intel does not address the problem of how to rebuild a full system including applications settings in an automated manner, without the requirement for a user console.

The above known approach has the disadvantage and risk of failure if applied to a headless computer entity. In a headless computer entity, there is no way an administrator of the entity can manually install software updates to the operating system or application software. Therefore, the entity needs some mechanism to update the operating system, but when the entity operating system is on disk, it is very difficult for a running operating system to update itself reliably. Further, if a running operating system on a headless entity attempts to update itself, and a fault occurs during an update, then the headless entity will crash and stop working, unless there is an effective automatic operating system rebuild scheme in place, which also restores applications settings.

What is required is an install or rebuild process that is triggered in a variety of ways such that the process can be fully automated or manually controlled depending upon the type of trigger. Additionally, there is a requirement for a rebuild process that is sensitive to the status of the computer entity data, such that if corrupted data is detected as part of the rebuild process this data would be deleted and replaced with uncorrupted default data. Conversely, if the data is uncorrupted the rebuild process would not unnecessarily replace this data with default data.

SUMMARY OF THE INVENTION

According to first aspect of the present invention there is provided a method of restoring an operational state of a computer entity, said computer entity comprising:

at least one data processor;

at least one data storage device;

a primary operating system capable of running said computer entity;

a secondary operating system capable of rebuilding said primary operating system; and a copy of said primary operating system stored on said data storage device;

said method comprising the steps of:

booting said computer entity to operate from said secondary operating system; and under control of said secondary operating system, rebuilding said primary operating system from said copy of said primary operating system.

According to a second aspect of the present invention there is provided a computer entity comprising:

at least one data processor;

at least one data storage device;

a primary operating system capable of running said computer entity;

a secondary operating system capable of rebuilding said primary operating system during a failure of said primary operating system; and a copy of said primary operating system According to a third aspect of the present invention there is provided a method of running a computer entity, said computer entity comprising:

a data storage device divided into a plurality of partition areas;

a primary operating system stored on a first said partition area;

a secondary operating system stored on a second said partition area;

said method comprising the steps of:

storing a back up copy of said operating system on a third said partition area.

According to one implementation of the present invention a computer entity, comprises a primary operating system and an emergency operating system. A copy of the primary operating system is stored in an operating system back-up area on a data storage device of the computer entity. A primary operating system install or rebuild involves replacing the primary operating system with a known good pristine copy of the primary operating system stored in the back-up area, followed by an application rebuild.

A primary operating system rebuild may be initiated by a variety of triggers, such triggers being for example, the primary operating system: failing to boot, locking up, crashing, or if corrupted data is detected. Additional triggers include a manually initiated reset of the primary operating system, performed via a web administration interface.

Depending upon the triggers initiating the rebuild process and a set of corresponding flags set by the triggering process the primary operating system may be rebuilt such that the computer entity configuration data is preserved, such data being for example, application configuration data, network configuration settings, security configuration settings, or user specific data. Alternatively, if data corruption is detected a different set of flags are set by the triggering of the rebuild process, such that all or part of the existing data is deleted and replaced with factory default data.

In one implementation, the end result following a failure of the primary operating system is that the headless computer entity automatically rebuilds the primary operating system without any user intervention. The computer entity is then ready to continue normal operations without any loss to any application data or application configuration settings. In such a situation the only impact to a user or users of the computer entity is that the system simply goes off-line for a period (in one implementation, approximately 20–30 minutes) before it regains fully operational on-line status.

In a further implementation the end result after a failure of the primary operating system is that the computer entity automatically rebuilds or installs the primary operating system without any user intervention such that all or part of the application data or application configuration settings are replaced with factory default data or default application configuration settings respectively.

Additionally, in the above implementations rebuilds may be controlled manually by a user communicating with the headless computer entity via a suitable web administration user interface.

Within this patent specification the terms install and rebuild are used interchangeable such that each term may be applied to a process by which the primary operating system is reconstructed.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

Figure 1:
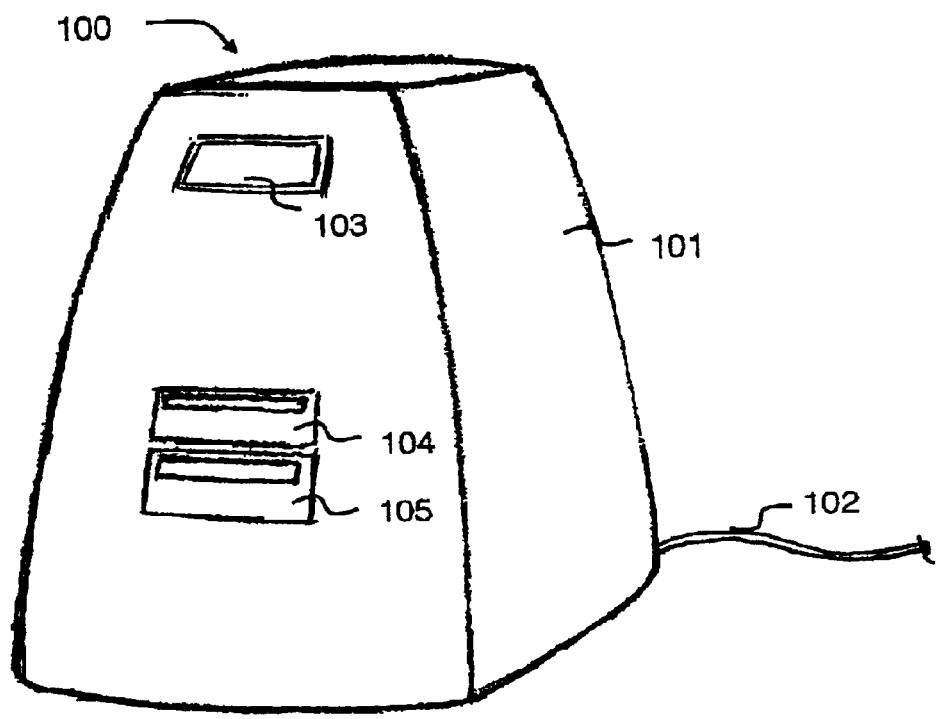
FIG. 1 illustrates schematically in perspective view a headless computer entity.

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

In this specification, the term "data storage device", is used to describe any non-volatile data storage device suitable for storage of binary data. The term include conventional hard disk drives. Where the term "disk" or "disk drive", this is a specific example of a data storage device. In principal, the methods and apparatus herein can be applied to any data storage device, and is not restricted specifically to disk drives or disks.

In the best mode, a headless computer entity applies a "self-repairing" method, triggered by an operating system failure, in which a fully automated rebuild of a primary operating system, and associated applications on the computer entity occurs.

The option of triggering an operating system rebuild by manual trigger via a web page interface is also provided, so that a user can manually initiate a primary operating system rebuild. Under manual triggering, the operating system rebuild can either preserve application data and application configuration settings of the computer entity, or delete application data and application settings of the computer entity. A manually initiated rebuild of the primary operating system with application data preserved may be triggered under circumstances which include as an example, where there is a suspected minor corruption of the primary operating system, where other important services provided by the computer entity are still running, but non-critical services provided by the computer entity have ceased to operate correctly.

Where a rebuild operation preserving computer entity data and settings are triggered manually, the procedure followed is similar to that where an automatic rebuild of the primary operating system is triggered, usually as a result of a failure of a primary operating system. Configuration settings of the computer entity are restored after the rebuild, and application data, being data generated by applications running on the computer entity and stored within the computer entity, is unaffected by the rebuild process.

On the other hand, where a rebuild is manually triggered in which the application data is deleted, the application configuration settings are restored, since these are still valid even if the application data is corrupted, however the application data itself is deleted during the rebuild process. The manually triggered primary operating system rebuild with application data delete process may be activated where for example under conditions where there is a suspected corruption of the application data, and it is required to re-set the application data back to a factory preset default condition.

In each of the three rebuild processes, that is automatic rebuild, manually triggered rebuild with application data preserve and the manually triggered rebuild with application data delete, running of the computer entity is handed over from a primary operating system to a secondary emergency operating system, which has the purpose of rebuilding the primary operating system from a reserve stored copy of the primary operating system. The primary operating system, emergency operating system, and back-up copy of the primary operating system are each stored on different storage device partitions within the computer entity. Once the primary operating system has been rebuilt from the stored back-up copy of the primary operating system, application configuration settings, which are stored in a further data storage device partition in the computer entity, are automatically reapplied. Examples of application configuration settings include networking configuration settings, describing a networking connection of the computer entity with other computer entities; installed user data, describing how many users are installed, and identifying those users; administration security data describing an administration security setup of the computer entity; installed user settings data describing individual settings applied to each of one or a plurality of installed users; and back-up schedule data, describing a type of back-up and a timing schedule for data back-up implemented in the computer entity.

In a normal running mode of the computer entity running under control of the primary operating system, the configuration data, stored in a data storage device partition area different to those used to store the primary operating system is updated either periodically and\or whenever configuration setting data changes. For example, when a new user is added to the computer entity, then the installed user data stored in the further data storage device partition area is automatically updated to reflect the fact that a new user has been installed. Similarly, under normal operation, updates of other configuration data types are stored in the further data storage device partition area. Under fault conditions, giving rise to a rebuild, the stored configuration data in the further partition is available to rebuild the operating system of the computer entity.

The computer entity configuration settings are archived into a plurality of settings files, and a CHECKsum algorithm is applied to ensure that that archived computer entity configuration setting data is not corrupted, when the computer entity configuration setting data is recovered.

Applications running on the computer entity store data in a dedicated data storage device partition. The application data may either be deleted completely, or retained, depending upon whether a primary operating rebuild operation with application data preserve, or with application data delete is initiated.

Referring to FIG. 1 of the accompanying drawings, there is illustrated schematically in perspective view a headless computer entity 100. The headless computer entity comprises a casing 101 containing a processor, memory, one or more data storage devices and one or more communications ports connectable to a local area network 102; optionally, a small display, for example a liquid crystal display (LCD) 103 giving limited information of the status of the device, for example POWER ON mode, a STAND BY mode, or other modes of operation; a CD ROM drive 104; and optionally a back-up data storage device 105, for example a known DDS tape storage device. The headless computer entity is not provided with console having a monitor, mouse, keyboard or other direct user interface, and does not allow direct interaction with a human operator. In operation, the headless computer entity is intended to be self-managing and self-maintaining, and typically will provide a particular function, for example data storage, within a network environment. An example of a headless computer entity of the type described may include a network attached storage device.

Figure 2:
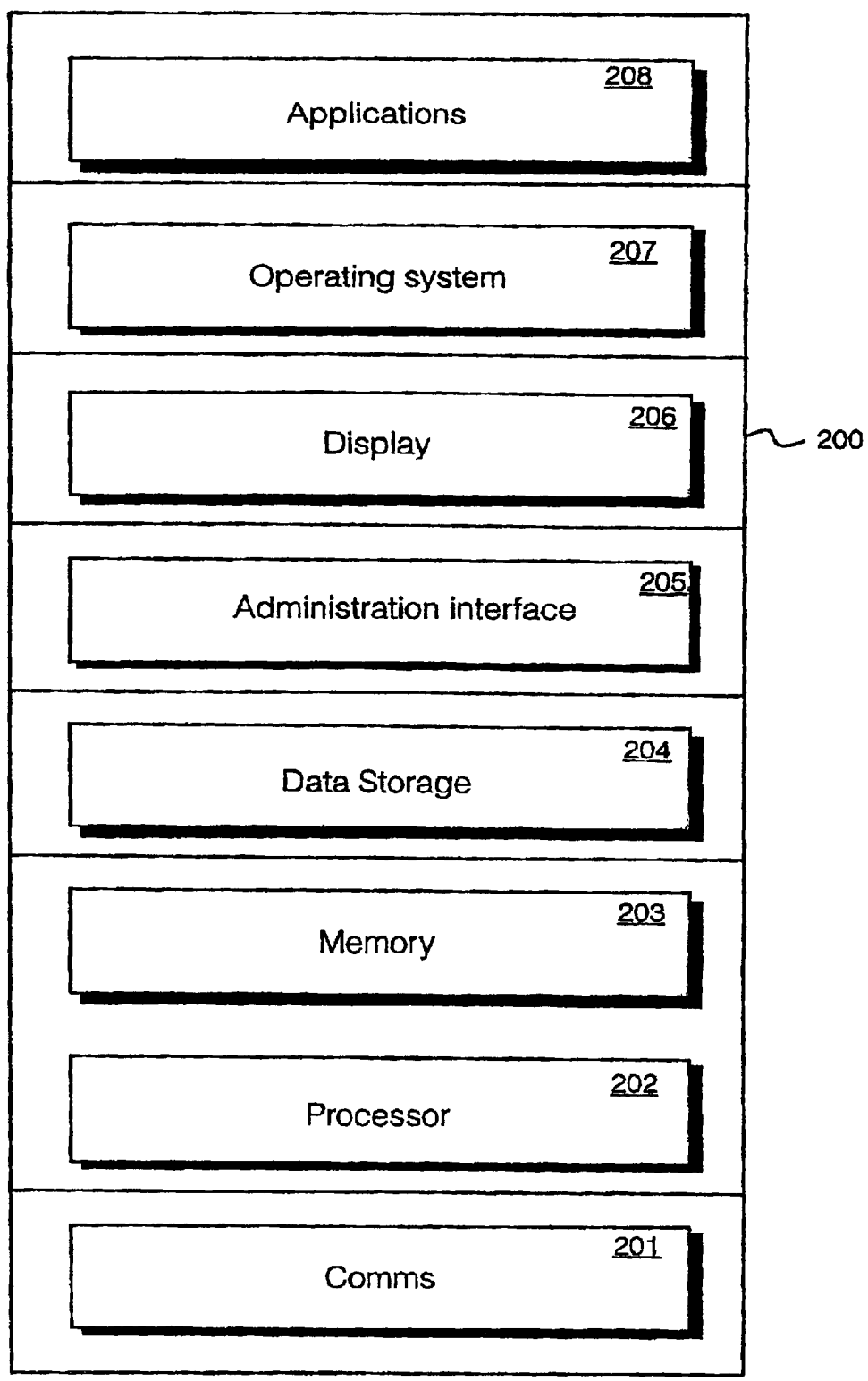
FIG. 2 illustrates schematically details of components of the headless computer entity of FIG. 1.

Referring to FIG. 2 herein, there is illustrated schematically an architecture of hardware and firmware components of the headless computer entity 200. The computer entity 200 comprises one or more communications ports 201; one or more data processing devices 202 as are known in the art; a memory 203 associated with the data processor(s); at least one data storage device 204, for example a hard disk data storage device, or an array of a plurality of hard disk data storage devices e.g. a RAID array; an administration interface 205 optimally in the form of an HTML/XML page display interface; a small display, e.g. a liquid crystal display device 206; a plurality of operating systems 207 as will be described herein after; and one or a plurality of application programs 208 providing functionality to the headless computer entity.

Figure 3:
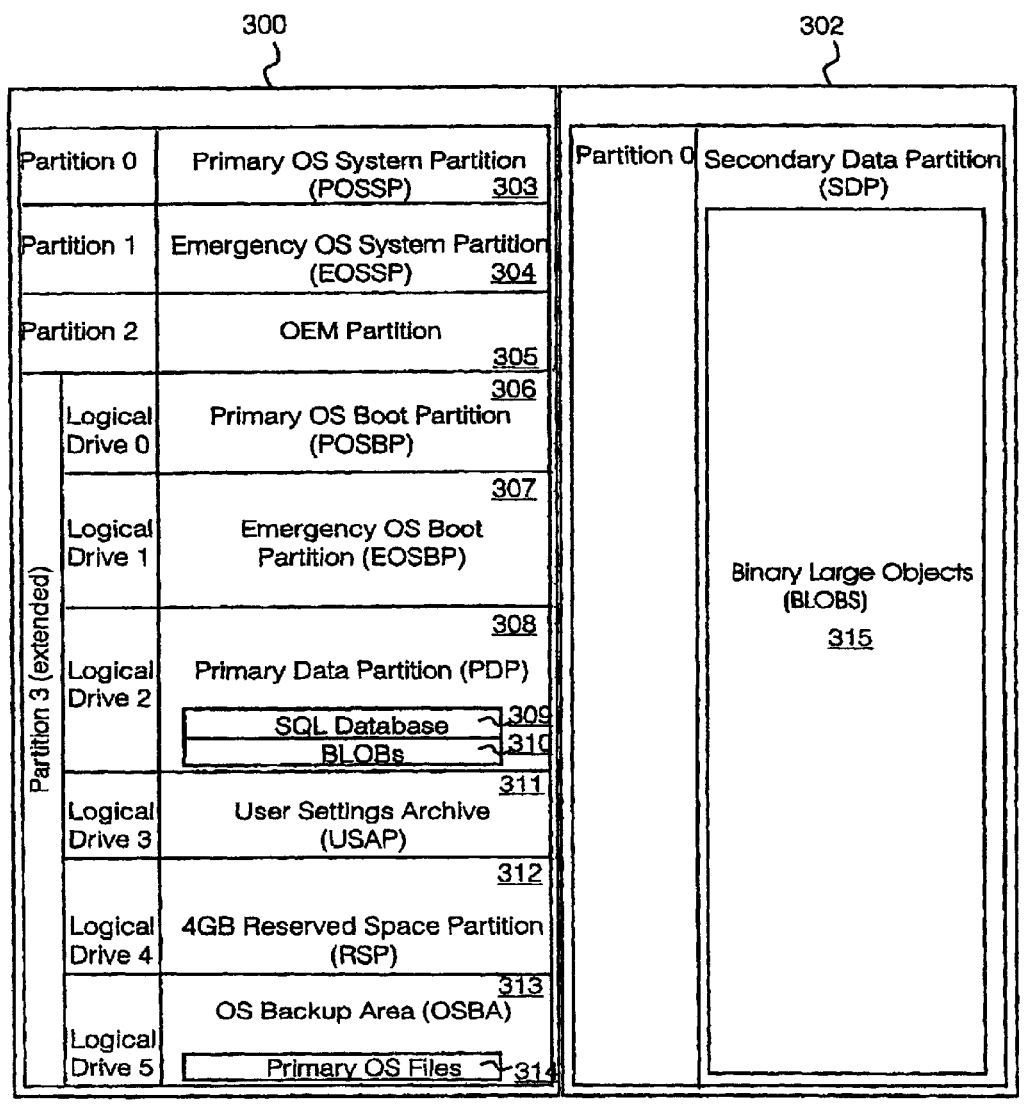
FIG. 3 illustrates schematically details of a partition architecture of a hard disk data storage device of the computer entity of FIG. 1.

Referring to FIG. 3 herein, there is illustrated schematically a format of data storage device 204, upon which operating system(s) 207 are stored. The data storage device is partitioned into a logical data storage area 300 which is divided into a plurality of partition areas according to the architecture shown. A main division into a primary partition area 300 and a secondary partition area 302 is made. Within the primary partition area are a plurality of partitions including a primary operating system system partition 303 (POSSP), containing key operating system files used to initiate a boot or re-boot of a primary operating system of the computer entity, an emergency operating system system partition 304 (EOSSP) containing files used for booting a secondary, emergency operating system under which the computer entity operates under conditions where the primary operating system is inactive or is deactivated; an OEM partition 305; a primary operating system boot partition 306 (POSBP), which contains a majority of files for the primary operating system and for one or more applications, and from which a boot or re-boot continues after initiation from the primary operating system system partition 303; an emergency operating system boot partition 307 (EOSBP) containing a majority of emergency operating system files, from which the emergency operating system continues to boot after initiation from the EOSSP 304; a primary data partition 308 (PDP) containing an SQL data base 309, and a plurality of binary large objects 310, (BLOBs); a user settings archive partition 311 (USAP) used to store user settings data; a reserved space partition 312 (RSP) typically having a capacity of the order of 4 gigabytes or more; and an operating system back-up area 313 (OSBA) containing a pristine uncorrupted back-up copy of the primary operating system files 314. The primary operating system system partition 303 and the emergency operating system system partition 304 are small "boot strap" system partitions which are used to start the operating system boot process for the primary or emergency operating system respectively, and then hand over the rest of the operating system boot processed to the primary operating system boot partition 306 or the emergency operating system boot partition 307 respectively, depending upon whether a primary operating system boot or an emergency operating system boot has been initiated. The secondary data partition 302 typically stores a plurality of binary large objects 315. In other implementations the secondary data partition 302, may store SQL database files, in addition to those SQL database files stored on the primary data partition 308.

The user settings archive partition 311 contains an archive of for example, user configuration settings, networking configuration settings, security configuration settings, including user administration names and passwords, TCP/IP addresses and net mask, the system network name, time zone information and application specific configuration settings. The user settings archive partition 311 contains non-default configuration settings that have been changed post-installation of the data storage device 204 e.g. following the creation of the partition architecture as detailed in FIG. 3 and an initial installation of the three operating systems. The purpose of the user settings archive is to provide a source of information to restore the original configuration settings of the computer entity and the applications on the computer entity 100.

The primary operating system files are divided between the primary operating system system partition 303, the primary operating system boot partition 306, the primary data partition 308 and the secondary data partition 302. The emergency operating system files are divided between the emergency operating system system partition 304, the emergency operating system boot partition 307 and if required a suitable data partition. The reserved space partition 312, during normal running of the computer entity in the field, is used as a "scratch space" area to create temporary files as part of the normal running of applications. This therefore separates out these temporary files from the other data partitions, and ensures that all the available space in the data partitions can be used for application data.

The primary data partition 308 and the secondary data partition 302, containing various data and databases, remain untouched when a primary operating system rebuild with data preserve process is triggered.

The operating system back-up area also contains "hotfix" software patches which serve as minor software updates. Such patches are typically introduced via a network connection or by means of a floppy disk. A minor update process using such patches is based on known patch installation software, but with inventive modifications as follows:

Firstly, basic version checking is performed so that each "hotfix" patch can only be applied into the primary operating system version that it is intended for.

Secondly, after the computer entity has rebooted successfully any patch files detected in the operating system back-up area during the primary operating system rebuild process are automatically reapplied at the end of this process. If there are multiple patches present, then they are reapplied in alphabetical main order.

A "hotfix" patch represents a portion of code which replaces a portion of the primary operating system such that in the event of a primary operating system failure or defect, a portion of the defective operating system may be replaced with the relavant portion of the primary operating system (i.e. "hotfix" patch) stored in the operating system back-up area.

Figure 4:
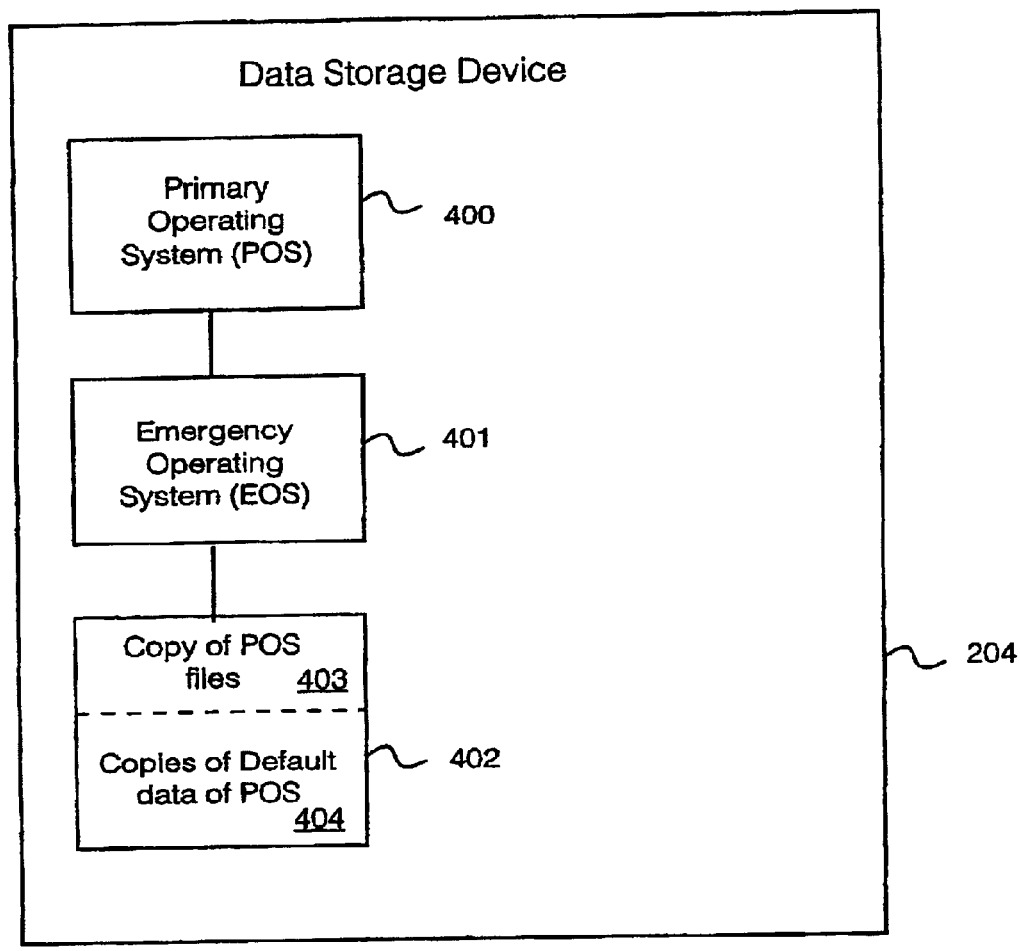
FIG. 4 illustrates schematically a logical operating system architecture comprising three operating systems present within the headless computer entity of FIG. 1.

Referring to FIG. 4 herein there is illustrated the three operating systems stored on the data storage device 204. The data storage device 204 comprises a primary operating system (POS) 400, an emergency operating system (EOS) 401 and a known good pristine copy of the primary operating system 402. The known good uncorrupted copy of the primary operating system comprises, for example, a copy of the primary operating system files 403 and copies of default data of the primary operating system 404. The primary operating system serves as the running or "live" operating system, the emergency operating system comprises a "cut down" version of the primary operating system. If the primary operating system fails, the emergency operating system is configured to rebuild the primary operating system using the known good back-up copy of the primary operating system 402.

The operating system back-up area 313 in addition to containing a copy of the primary operating system files 314, also contains data describing the manufacturing default state of the primary operating system partition and the data partitions.

Figure 5:
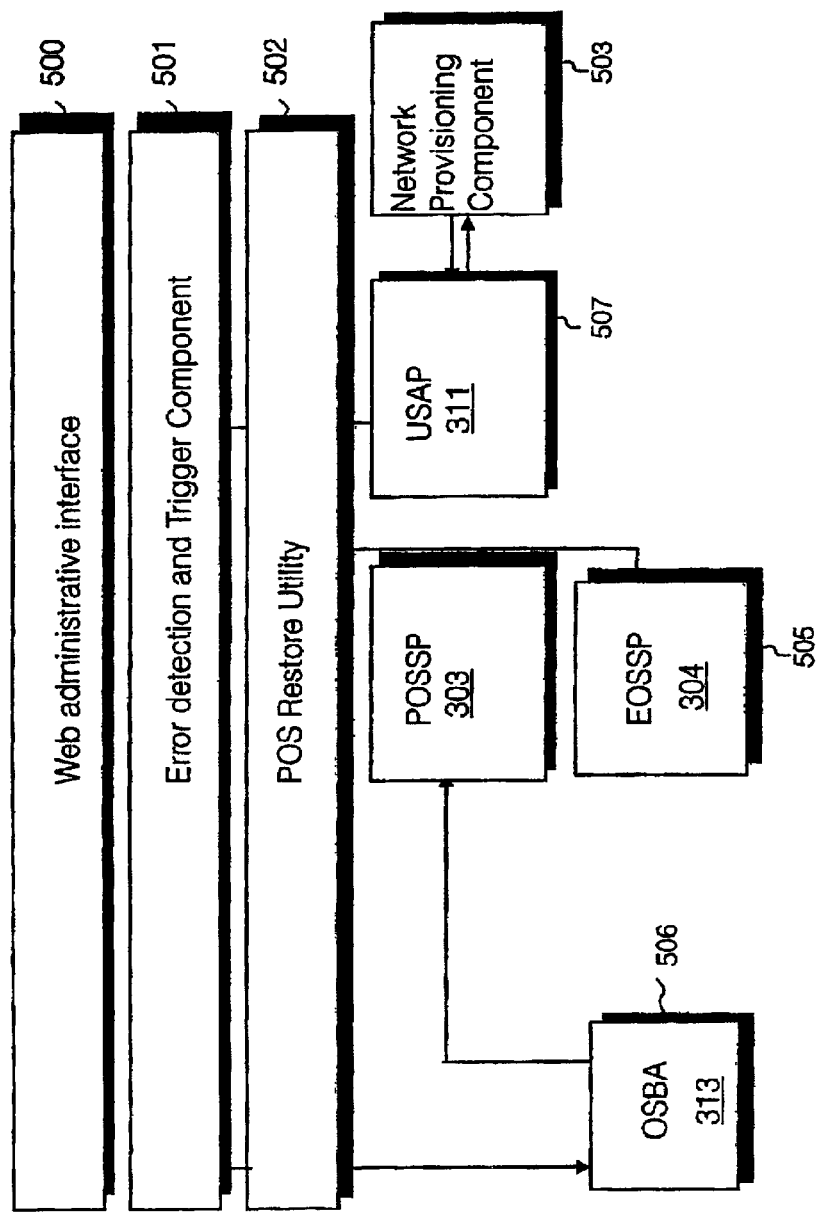
FIG. 5 illustrates schematically components of the operating systems and applications used in a self-repairing mode for rebuilding a primary operating system and application configuration settings.

Referring to FIG. 5 herein, there is illustrated schematically an architecture of operating system 207 and administration interface 205. The operating system and interface comprises a web administration interface 500 allowing access to the computer entity via a page display over a network connection, and allowing a manual reset operation of the computer entity to be instructed from a remote user console; an error detection and reset trigger component 501 for detecting errors or faults in the primary operating system, and triggering a reset operation; a primary operating system restore utility 502 for carrying out a reset operation in response to a trigger signal generated by the error detection trigger component 501, or in response to a command for a reset by a user input via web administration interface 500; a network provisioning component 503 for provisioning other computer entities in a network, e.g. user or client computers;

and as described previously, the primary operating system system partition 303; the emergency operating system system partition 304; the operating system back-up area 313; and the user settings archive partition 311.

Figure 6:
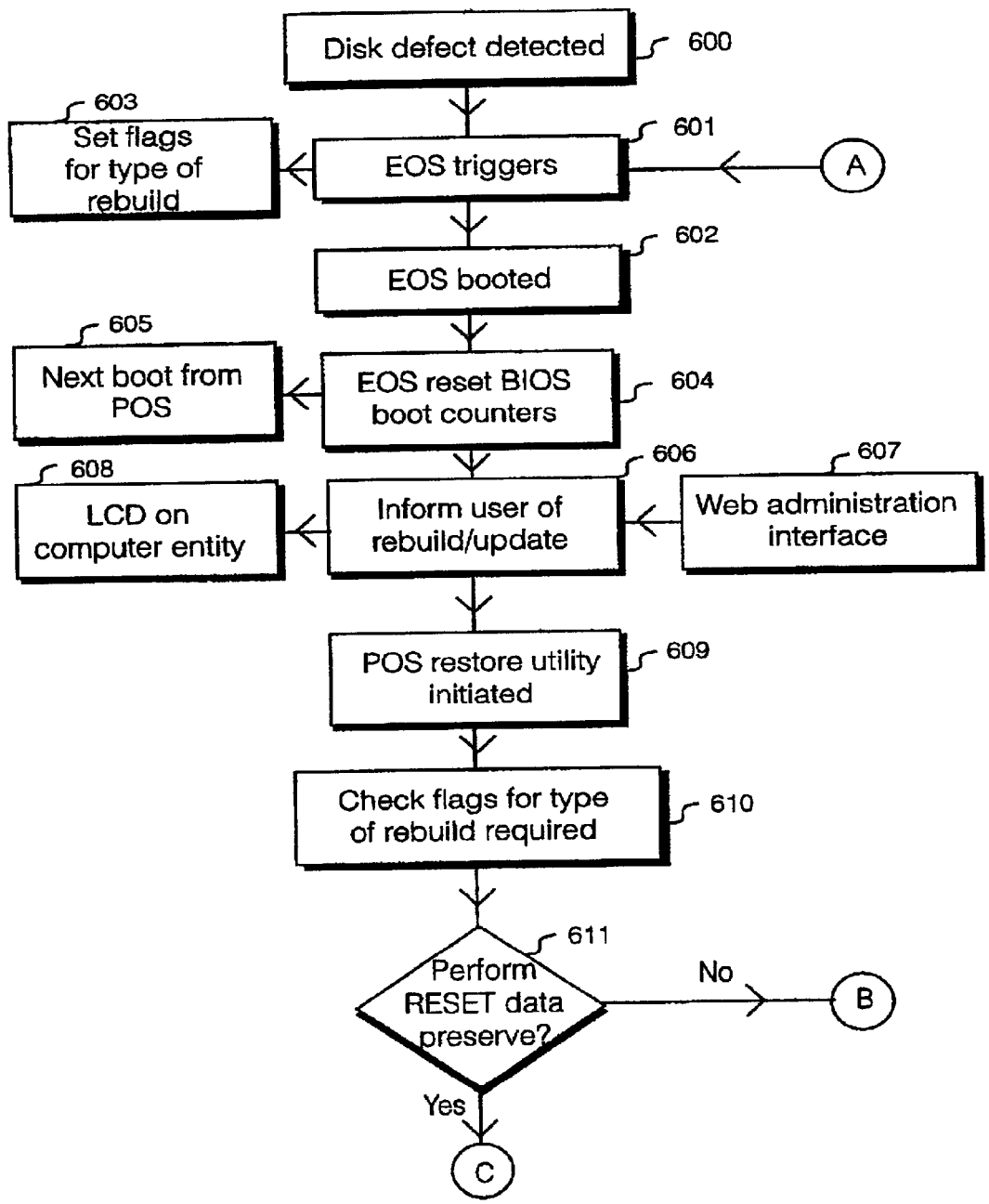
FIG. 6 illustrates a flow diagram showing schematically initial process steps of an operating system rebuild process of the computer entity.

Referring to FIG. 6 herein there is illustrated initial stages of a rebuild process, initiated by detection of a defect on the data storage device 204 at stage 600. The emergency operating system is triggered at step 601. The various triggers associated with the reboot process described herein are detailed in FIG. 7 below. Following a trigger as detailed in FIG. 7 the emergency operating system is booted at stage 602. There are two ways of booting into the emergency operating system at stage 602, these being firstly via a "fail-over" scheme trigger, which is a BIOS based scheme such that if the primary operating system fails to boot a predetermined number of times e.g. twice, then the BIOS will automatically boot from the emergency operating system system partition. Secondly, the emergency operating system may be booted by software responsive to the triggers detailed in FIG. 7. Following the booting of the emergency operating system at stage 602 specific flags are set to indicate a specific type of rebuild process, at stage 603. Differing rebuild processes include, a rebuild process preserving user data and a rebuild process deleting user data. An emergency operating system boot counter is reset by the BIOS at stage 604, such that the next boot of the computer entity 100 is from the primary operating system as shown in stage 605. A user of the computer entity 100 is informed of the type of rebuild/update in step 606, such information being displayed via the web administration interface in step 607 and/or a liquid crystal display on the computer entity 100 at stage 608. The primary operating system restore utility is initiated in step 609 and depending upon the flags set at 603, which are determined effectively by the type of trigger (see FIG. 7) the primary operating system restore utility determines the type of rebuild required at 610. The type of flags or indicators set at stage 603 determine a rebuild with data preserve or data delete at stage 611.

Figure 7:
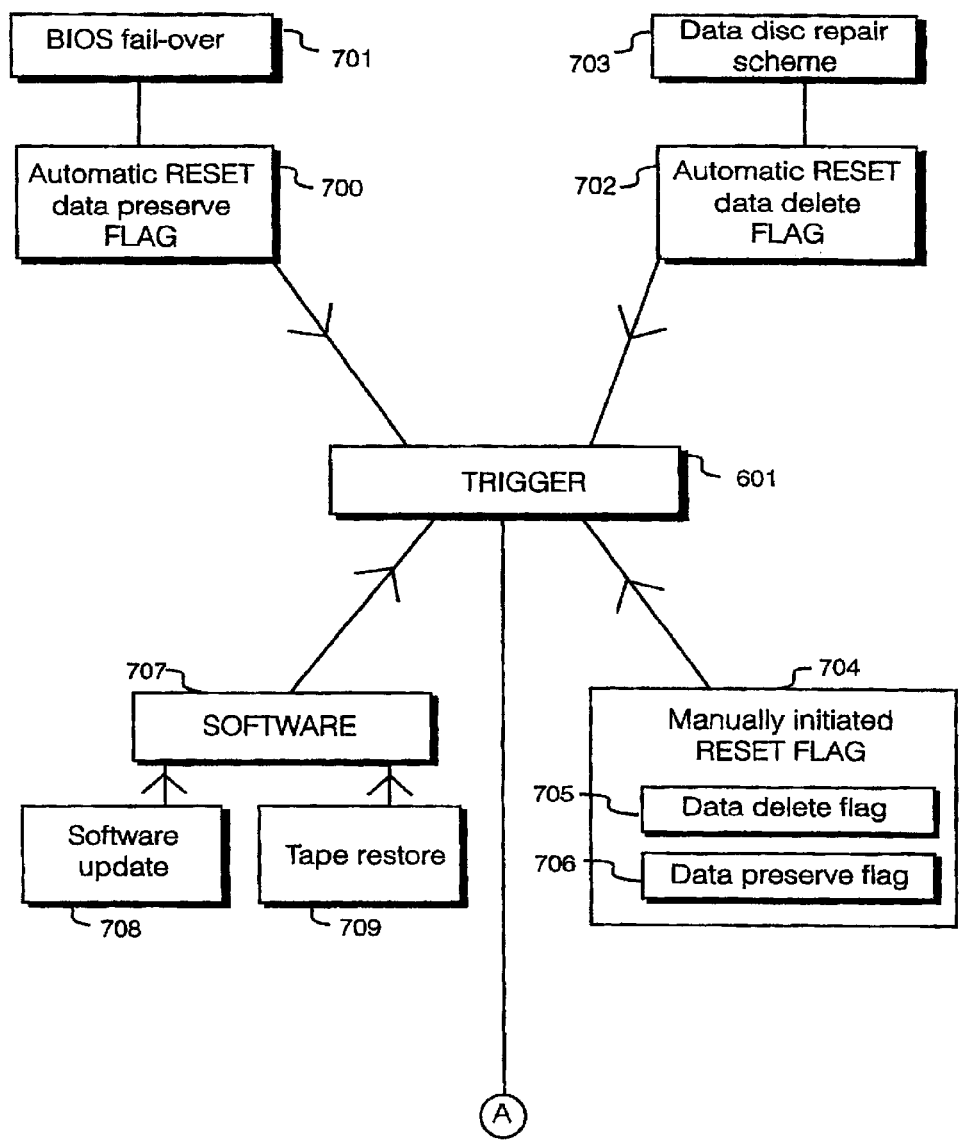
FIG. 7 illustrates schematically a plurality of trigger mechanisms which initiate an operating system rebuild process of the computer entity.

Referring to FIG. 7 herein there is illustrated a variety of triggers which are used to initiate the booting of the emergency operating system at stage 602. A first automatic reset with data preserve flag set 700, occurs when the BIOS fail-over scheme is initiated 701. Alternatively, an automatic reset flag for data delete 702 is set when a data disk repair scheme 703 is initiated, such a data disk repair scheme being initiated when, for example, it has been detected that data on the data storage device 204 is corrupted.

The emergency operating system may be booted following a manually initiated trigger 704 whereby the data delete flag 705 or the data preserve flag 706 may be set in response to a command entered via web administration interface 500. Additionally, the emergency operating system may be booted by software 707 in response to an instruction to perform a software update 708 or in response to an instruction for a tape restore 709. A tape restore may be required when for example, corruption of the back-up data/databases on the data storage device 204 occurs. When performing a tape restore 709 the primary operating system restore utility 502 firstly erases the data of the computer entity and installs the back-up data from the tape. Secondly, the utility should check that the back-up tape media from which the user wishes to restore has the correct data and application name.

Figure 8:
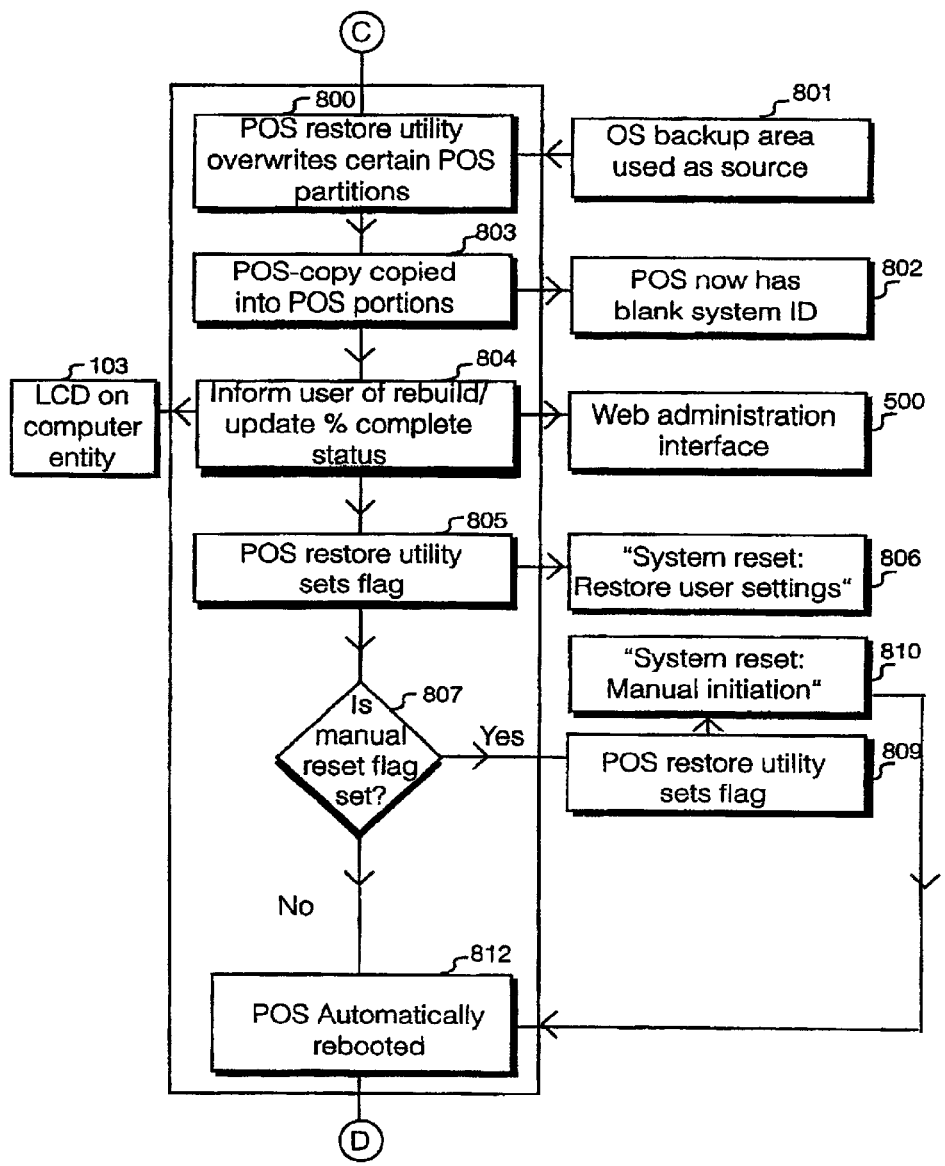
FIG. 8 illustrates schematically a flow diagram showing process steps of a rebuild process in which application data is preserved.

Referring to FIG. 8 herein there is illustrated a flow diagram detailing the various stages of the rebuild process in which the data preserved flag has been set. The primary operating system restore utility overwrites selected primary operating system partitions, these being the primary operating system system partition and the primary operating system boot partition at stage 800. The operating system back-up area is used as a source to replace the files to be overwritten in both partitions at stage 801. Following the overwriting of the partitions at stage 800 the system identification (SID) is blank. The result of overwriting the partitions at stage 800, with files from the operating system back-up area, is a copy of the primary operating system being installed into the primary operating system system partition and the primary operating system boot partition at stage 803. The user is informed of the status of the rebuild/update process at 804, such status information being displayed via the web administration interface 500 and/or the liquid crystal display on the computer entity.

The primary operating system restore utility sets a flag in step 805 in the user settings archive partition to indicate that the system reset should restore the user settings 806. The primary operating restore utility checks whether the manual reset flag was set following the boot into the emergency operating system at step 807. If the restore utility detects that the manual flag was set, it sets a further flag to indicate system reset: manual initiation at stages 809 and 810 respectively. Irrespective of the detection of a manual reset flag the primary operating system is rebooted at step 814.

Figure 9:
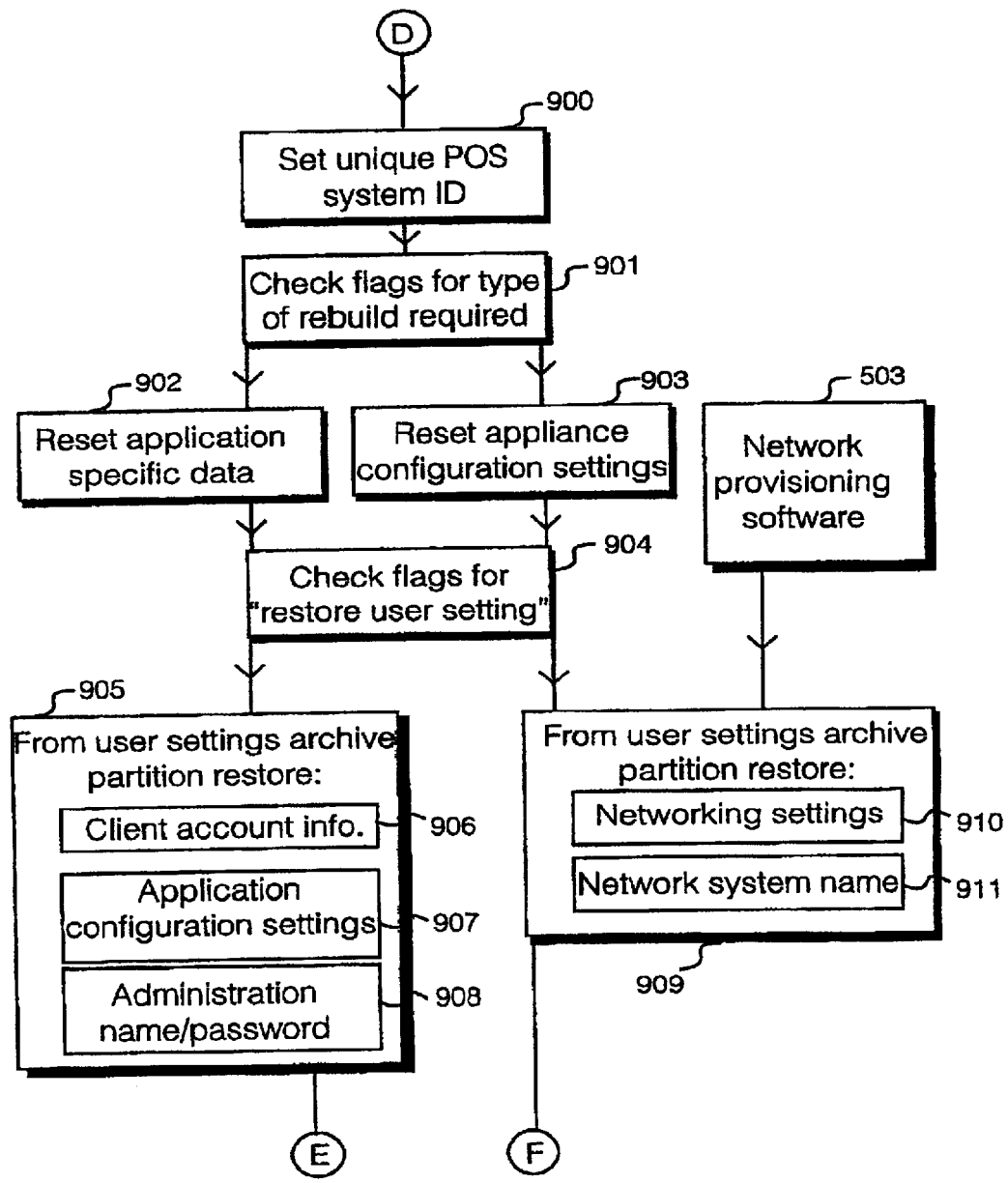
FIG. 9 illustrates schematically a flow diagram showing further process steps of the rebuild process of FIG. 8.

Referring to FIG. 9 herein there is illustrated the latter stages of the rebuild process. At step 900 the primary operating system is in a manufacturing default state, such that it will now set its system identification following this first boot. The restore utility checks the flags for the type of rebuild required at stage 901. Following the protection of reset application specific data 902 and the reset computer entity configuration settings 903 the restore utility checks the flags for "restore user settings" 904. The restore utility proceeds to restore the user settings from the user settings archive partition 311 at step 905. The type of settings include, for example, client account information 906, application configuration settings 907 and administration name/password 908. In addition to resetting the application specific data 905 the restore utility restores the computer entity configuration settings at 909, such settings being for example, the network settings 910 and the network system name 911. The computer entity configuration settings are restored using the network provisioning component 503.

Figure 10:
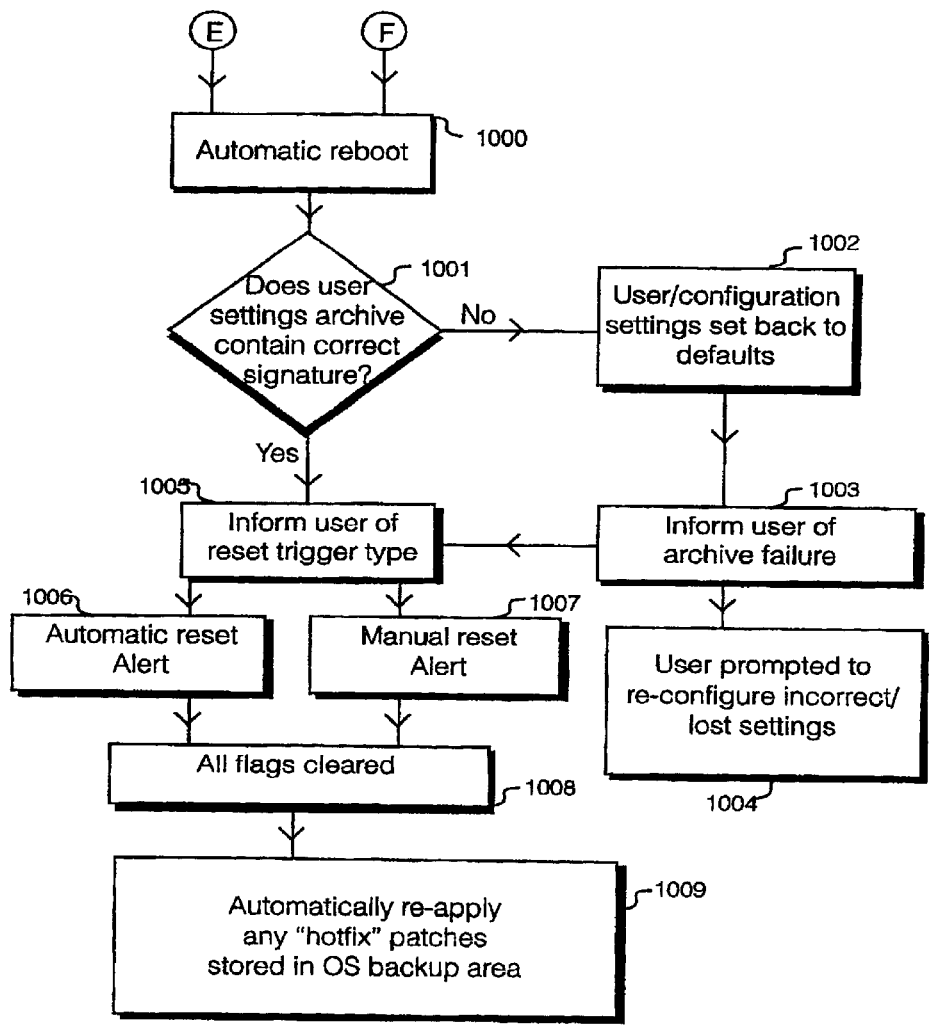
FIG. 10 illustrates schematically a flow diagram showing yet further process steps of the rebuild process of FIG. 8.

Referring to FIG. 10 herein there is illustrated the final stages of the rebuild process such that following the restoring of the settings the primary operating system reboots at step 1000. The user settings archive 311 is checked for the correct signature at step 1001. When the primary operating system restore utility attempts to retrieve the archive data, a CHECKsum parity check utility checks the signature within the user settings archive to establish if the contents within the user settings archive (the configuration data etc.) are incorrect. If incorrect the CHECKsum utility notes the particular failure e.g. a failure in the application configuration data, user account information or network configuration settings. In the event of the user settings archive containing an incorrect signature the user/configuration settings are set back to factory defaults at step 1002 and the user is informed of an archive signature failure at step 1003. Also the user is prompted to re-configure the incorrect and/or lost settings at step 1004, such reconfiguring being performed by the user via, for example, a web administration interface. Irrespective of the archive signature status the user is informed of the reset trigger type at step 1005, such trigger types being as detailed in FIG. 7 and include an automatic reset. In such instances the automatic reset alert will be displayed to the user via the web administration interface and/or the liquid crystal display at step 1006. If the emergency operating system was booted following a manual reset trigger a user of the computer entity 100 will be informed of a manual reset alert via the web administration interface and/or the liquid crystal display at step 1007. All flags set by the restore utility are cleared at step 1008. Any "hotfix" patches stored in the operating system back-up area will then be automatically reapplied to the newly restored primary operating system at step 1009, such that the newly restored primary operating system contains all updated data and settings prior to the primary operating system failure.

Figure 11:
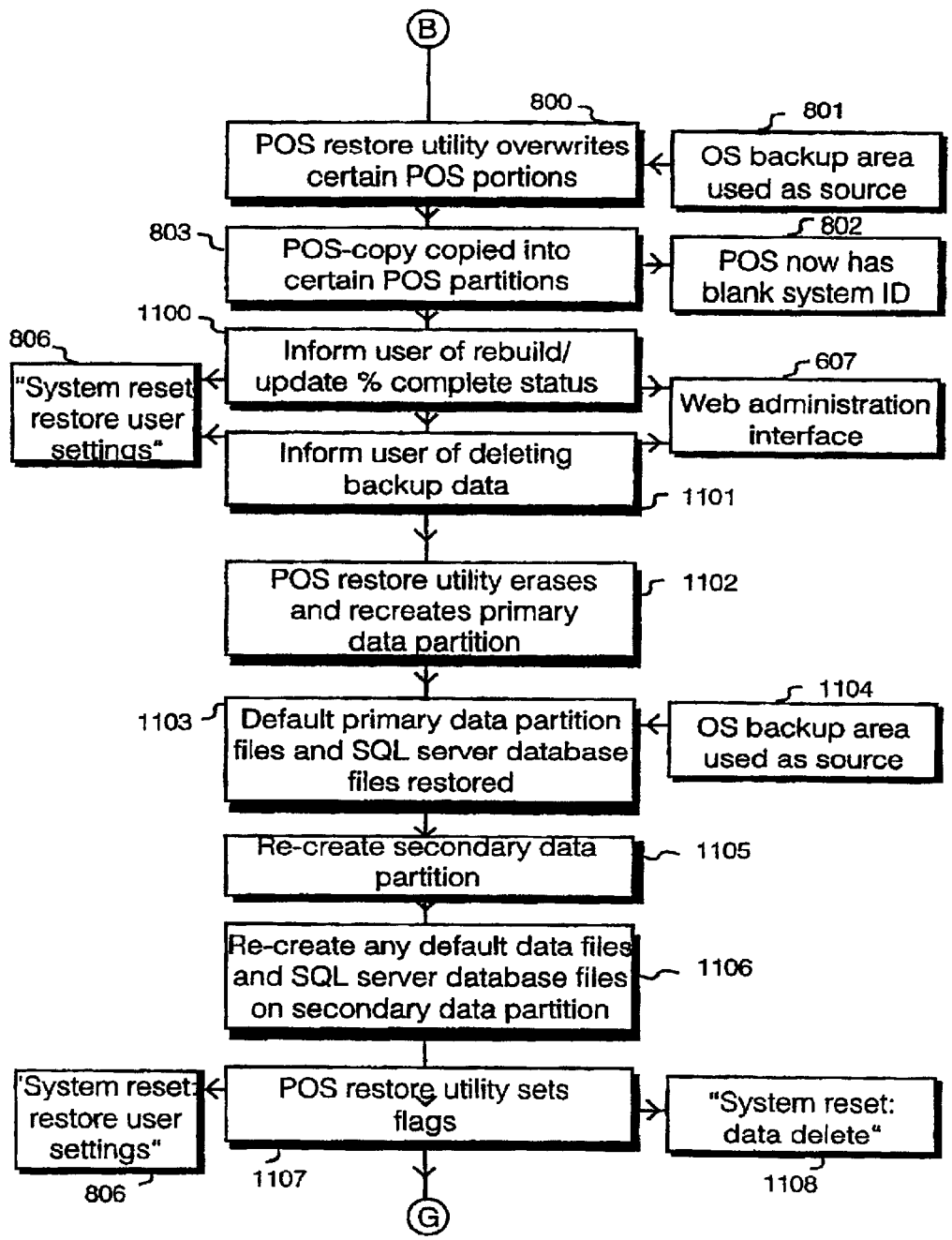
FIG. 11 illustrates schematically a flow diagram showing process steps of a rebuild process whereby application data is deleted.

Referring to FIG. 11 herein there is illustrated the stages of the rebuild process whereby the emergency operating system is booted at stage 602 having the data delete flag set.

The primary operating system restore utility overwrites certain primary operating system partitions, these being the primary operating system system partition 303 and the primary operating system boot partition 306 at step 800. The operating system back-up area is used as a source to replace the files to be overwritten in both partitions at step 801. Following the overwriting of the partitions at step 800 the system identification (SID) is blank. The result of the overwriting of the partitions at step 800 with files from the operating system back-up area result in a copy of the primary operating system being installed into the primary operating system system partition and the primary operating system boot partition at step 803. A user of the computer entity 100 is informed of the rebuild status at 1100. Such rebuild status information being displayed to the user via a web administration interface 500 and/or the liquid crystal display 103 at step 806. Additionally, a user of the computer entity 100 is also informed of the process of deleting the back-up data at step 1101. The primary operating system restore utility then proceeds to erase and recreate the primary data partition at step 1102, the default primary data partition files and the SQL server default database files are restored at 1103 from the operating system back-up area 313 at step 1104. The secondary data partition is recreated at step 1105, and any default data files and SQL server database files are recreated at step 1106. The restore utility sets the relevant flags at 1105 such flags being the "system reset: data delete" flag 1106 and the "system reset: restore user settings" flag 806.

Figure 12:
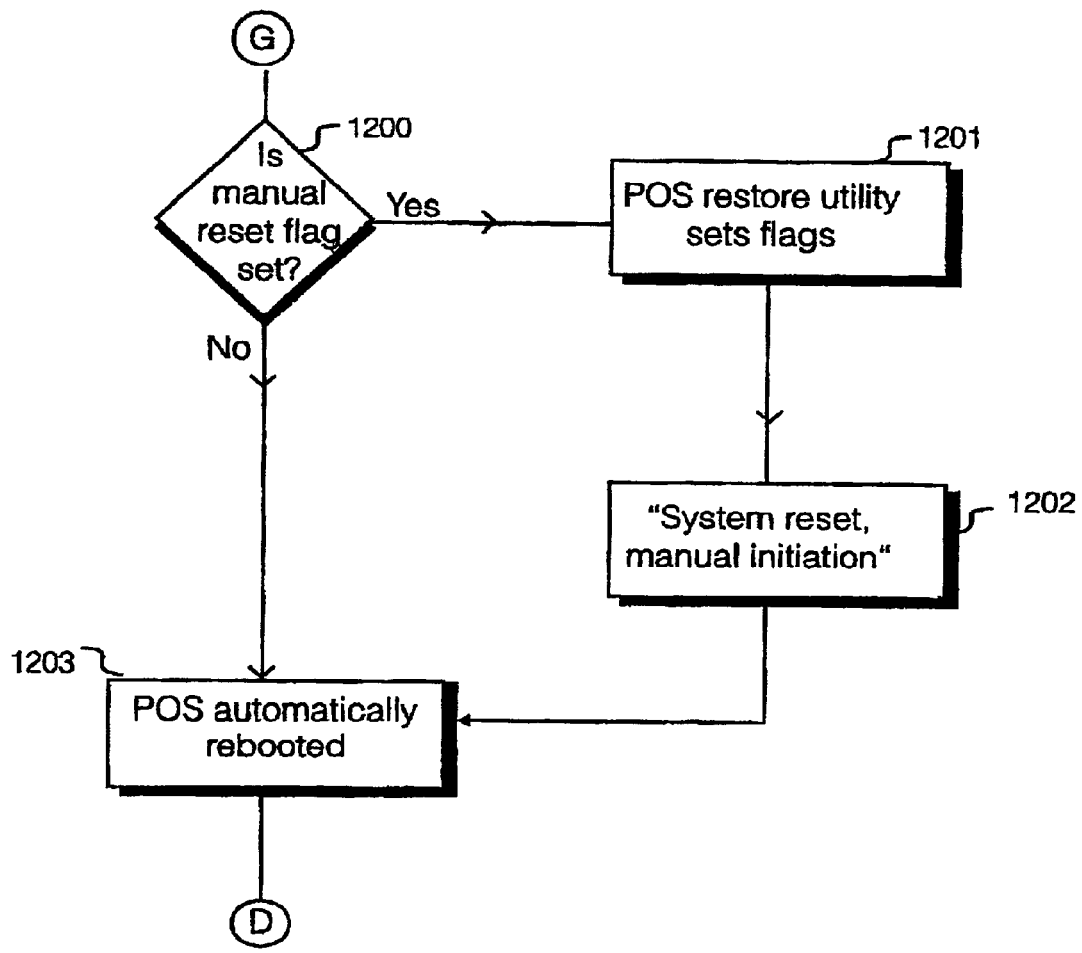
FIG. 12 illustrates schematically a flow diagram showing the final process is steps of the data delete rebuild process of FIG. 11.

Referring to FIG. 12 herein there is illustrated the final stages of the restore process with data delete. The restore utility checks for a manual reset flag at step 1200. If a manual reset flag is detected the primary operating system restore utility sets a flag 1201, this flag being a "system reset: manual initiation" flag 1202. The primary operating system is then automatically rebooted at step 1203. Following automatic reboot, user settings and application settings are restored, and there is displayed a message on the web administration interface and/or liquid crystal display based on the flags set, which allows a user to tell what type of reset has been performed, as described with reference to FIG. 9 herein before.

A primary operating system rebuild incorporating data delete as detailed in FIGS. 11 and 12 may be considered as an emergency rebuild process in the event of a tape restore not being available. Situations in which an operating system rebuild with data delete would be required include the data within the primary data partition and/or the secondary partition and/or data on a second data disk being corrupted. Additionally, the above data delete process may be required when a data storage device 204, being a data disk, has failed due to an error with the disk or its data.

What is claimed is:

1. A method of restoring an operational state of a computer entity, said computer entity comprising:
    at least one data processor;
    at least one data storage device;
    a primary operating system capable of running said computer entity;
    a secondary operating system capable of rebuilding said primary operating system; and
    a known good, pristine copy of said primary operating system; and
    patch data representing a portion of code which replaces a portion of said primary operating system stored on said data storage device,
    said method comprising the steps of:
    booting said computer entity to operate from said secondary operating system;
    rebuilding, under control of said secondary operating system, said primary operating system from said copy of said primary operating system; and
    applying said patch data to the rebuilt primary operating system.

2. The method as claimed in claim 1, further comprising the step of:
    erasing said primary operating system prior to rebuilding said primary operating system from said copy of said primary operating system.

3. The method as claimed in claim 1, further comprising the step of:
    restoring configuration settings of said computer entity from configuration data stored in a partition of said data storage device separate from said primary operating system and secondary operating system.

4. The method as claimed in claim 3, wherein said configuration data comprises data describing one or more application settings for running an application on said computer entity.

5. The method as claimed in claim 3, wherein said configuration data comprises data selected from the set:
    network configuration data describing a networking configuration of the computer entity;
    administration security data describing administration security settings applied to the computer entity;
    installed user data describing installed users on the computer entity;
    user settings data describing individual settings for at least one installed user on the computer entity; and
    back-up schedule data describing a back-up schedule for backing up data of said computer entity.

6. The method as claimed in claim 3, further comprising the step of applying a CHECKsum to said configuration data prior to storing said configuration data in said partition.

7. The method as claimed in claim 3, further comprising the step of:
    checking said configuration data for corruption prior to restoring said configuration settings.

8. The method as claimed in claim 1, further comprising the step of:
    restoring data describing default application settings used by at least one application program of said computer entity.

9. The method as claimed in claim 1, further comprising the step of:
    deleting application data generated by at least one application program of said computer entity.

10. The method as claimed in claim 1, wherein said boot of said secondary operating system is activated automatically under conditions selected from the following set:
   a failure of said primary operating system; and
   a failure of a boot from a partition of said data storage device including said primary operating system.

11. The method as claimed in claim 1, further including version checking the rebuilt primary operating system so that said patch data is only applied to said rebuilt primary operating system if the version of said rebuilt primary operating system is a version for which said patch data is intended.

12. A method of restoring an operational state of a computer entity, said computer entity comprising:
   at least one data processor;
   at least one data storage device;
   a primary operating system capable of running said computer entity;
   a secondary operating system capable of rebuilding said primary operating system; and
   a known good, pristine copy of said primary operating system stored on said data storage device;
   said method comprising the steps of:
   booting said computer entity to operate from said secondary operating system;
   under control of said secondary operating system, rebuilding said primary operating system from said pristine copy of said primary operating system; and
   determining whether a rebuild of said primary operating system is triggered with application data deleted or with application data preserved by reading a plurality of settings flags.

13. The method as claimed in claim 1, further comprising the steps of:
   resetting said computer entity by rebooting from said secondary operating system;
   deleting application data stored on a data storage device of said computer entities; and
   recreating default application data on said data storage device.

14. The method as claimed in claim 13, further comprising the step of recreating default databases on said data storage device.

15. A computer entity comprising:
   at least one data processor; and
   at least one data storage device including:
   (a) a primary operating system capable of running said computer entity;
   (b) a secondary operating system capable of rebuilding said primary operating system during a failure of said primary operating system;
   (c) a known good, pristine copy of said primary operating system;
   (d) patch data representing a portion of code for replacing a portion of said primary operating system; and
   (e) an instruction set for applying said patch data to said primary operating system after said primary operating system is rebuilt by said secondary operating system.

16. The computer entity as claimed in claim 15, wherein:
   said primary operating system is stored in a first partition area of said data storage device;
   said secondary operating system is stored in a second partition area of said data storage device;
   said copy of said primary operating system is stored in a third partition area of said data storage device; and
   said configuration data is stored in a fourth partition area of said data storage device.

17. The computer entity as claimed in claim 15, wherein said configuration data comprises data selected from the set:
   network configuration data describing a networking configuration of the computer entity;
   administration security data describing administration security settings applied to the computer entity;
   installed user data describing installed users on the computer entity;
   user settings data describing individual settings for at least one installed user on the computer entity; and
   back-up schedule data describing a back-up schedule for backing up data of said computer entity.

18. The computer entity as claimed in claim 15, further comprising an administration interface configured to allow a manually activated trigger of a rebuild of said primary operating system.

19. The computer entity as claimed in claim 15, comprising an automatic trigger operable to detect when a fault occurs in said primary operating system, and upon detecting a fault in said primary operating system, triggering a boot from said secondary operating system.

20. The computer entity as claimed in claim 15, wherein said data storage device comprises at least one disk drive.

21. The computer entity as claimed in claim 15, which is devoid of a user console running directly from a said operating system of said computer entity.

22. A method of running a computer entity, said computer entity comprising:
   a data storage device divided into a plurality of partition areas;
   a primary operating system stored on a first of said plurality of partition areas; and
   a secondary operating system stored on a second of said plurality of partition areas, said method comprising the steps of:
   restoring the primary operating system stored on the first partition area by using the secondary operating system stored on the second partition area;
   storing as a back up copy a known good pristine copy of the primary operating system on a third of said plurality of partition areas;
   storing patch data representing a portion of code which replaces a portion of said primary operating system on said third partition area;
   applying the patch data to the primary operating system stored on the third partition area after the restoring step has been performed.

23. The method as claimed in claim 22, further comprising the step of automatically updating configuration data stored in a fourth partition area of said data storage device.

24. The method as claimed in claim 23, wherein said configuration data comprises:
   network configuration data describing a networking configuration of said computer entity;
   administration security data describing administration security settings applied to said computer entity;
   installed user data describing installed users on said computer entity;
   user settings data describing individual settings for at least one installed user on said computer entity; and
   back-up schedule data describing a back-up schedule for backing up data of said computer entity.

* * * * *